United States Patent [19]

Ward

[11] Patent Number: 5,198,938
[45] Date of Patent: Mar. 30, 1993

[54] WIDE-ANGLE MIRROR ATTACHMENT FOR A TRUCK OR VAN

[76] Inventor: Jeffrey L. Ward, 3320 Wall Blvd., 11-102, Gretna, La. 70056

[21] Appl. No.: 672,489

[22] Filed: Mar. 20, 1991

[51] Int. Cl.$^5$ ............................ G02B 5/08; G02B 7/18; B60R 1/06
[52] U.S. Cl. .................................. 359/864; 359/865; 359/866; 359/871; 359/872; 248/475.1; 248/479; 248/484
[58] Field of Search ............... 350/612, 616, 625, 626, 350/627, 632, 639; 248/475.1, 479, 481, 484; 359/850, 855, 864, 865, 866, 871, 872

[56] References Cited

U.S. PATENT DOCUMENTS

| | | | |
|---|---|---|---|
| 1,114,559 | 10/1914 | Weed | 359/864 |
| 1,754,540 | 4/1930 | Behrendt | 350/606 |
| 1,972,320 | 9/1934 | Schaal | 248/481 |
| 2,413,894 | 1/1947 | Sorenson . | |
| 2,916,967 | 12/1959 | Husak . | |
| 3,424,424 | 1/1969 | Kelley | 350/616 |
| 3,644,021 | 2/1972 | Hamby . | |
| 3,667,833 | 6/1972 | Baldwin, Sr. . | |
| 3,826,563 | 7/1974 | Davis | 350/303 |
| 4,025,173 | 5/1977 | Schmaedeke | 350/304 |
| 4,073,461 | 2/1978 | Lopez | 248/475 R |
| 4,111,532 | 9/1978 | Budish | 350/307 |
| 4,208,104 | 6/1980 | Peterson | 350/304 |
| 4,253,738 | 3/1981 | Linkous | 350/304 |
| 4,637,694 | 1/1987 | Castaneda | 350/626 |
| 4,830,326 | 5/1989 | Schmidt et al. | 359/872 |
| 4,892,401 | 1/1990 | Kittridge et al. | 350/626 |
| 4,921,340 | 1/1990 | Dyer | 350/612 |

FOREIGN PATENT DOCUMENTS

| | | | |
|---|---|---|---|
| 2108953 | 8/1972 | Fed. Rep. of Germany | 350/626 |
| 2233254 | 2/1973 | Fed. Rep. of Germany | 350/626 |

OTHER PUBLICATIONS

McKesh portable rear view mirror adverusement; McKesh, Inc., Scappoose, Oreg. Dec. 1989 p. 119.

*Primary Examiner*—Bruce Y. Arnold
*Assistant Examiner*—R. D. Shafer
*Attorney, Agent, or Firm*—Milton S. Gerstein

[57] ABSTRACT

A wide-angle mirror attachment for an existing side mirror of a van, pick-up truck, truck, and the like, whereby all blind spots are eliminated when viewing the rear during driving. The wide-angle mirror attachment in a first embodiment is uniquely designed for a specific type of pick-up truck, and, in other embodiments is provided will a more universal-type of mount that allows it to be mounted to most types of trucks and vans.

12 Claims, 3 Drawing Sheets

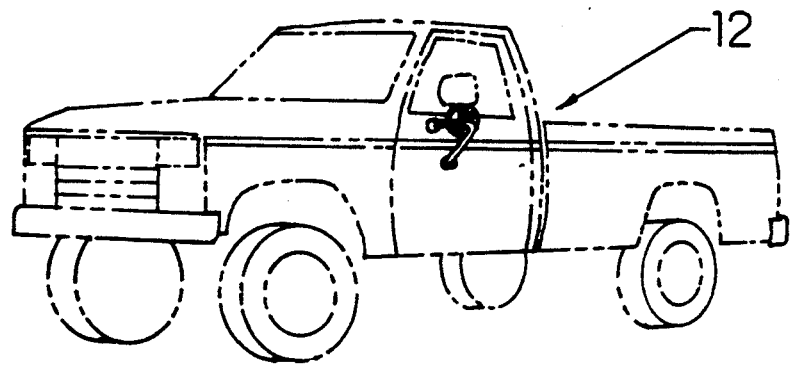
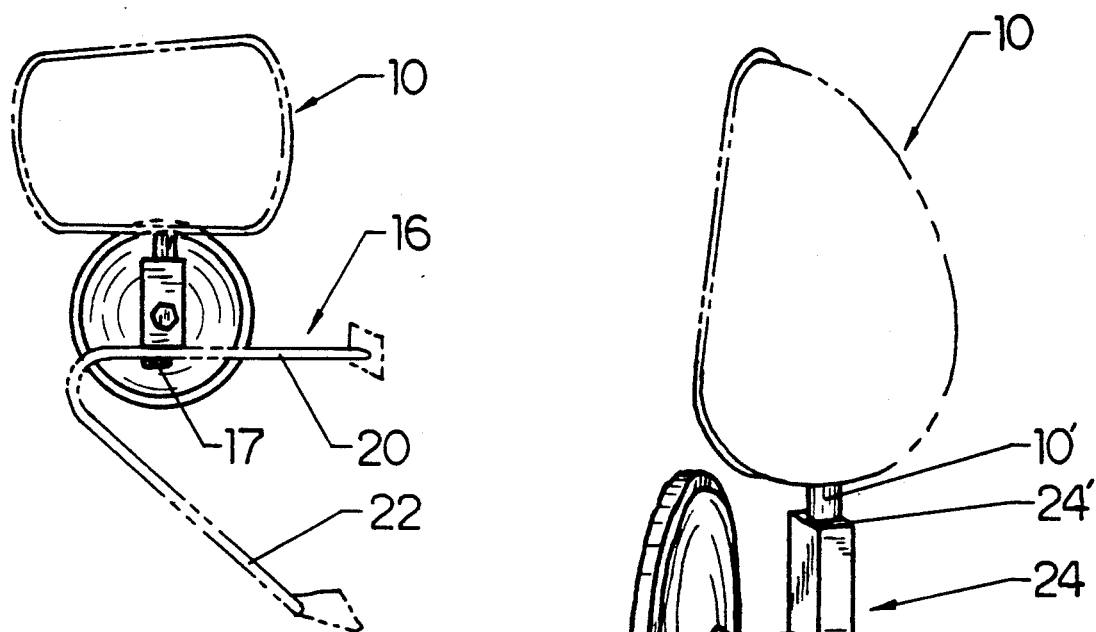
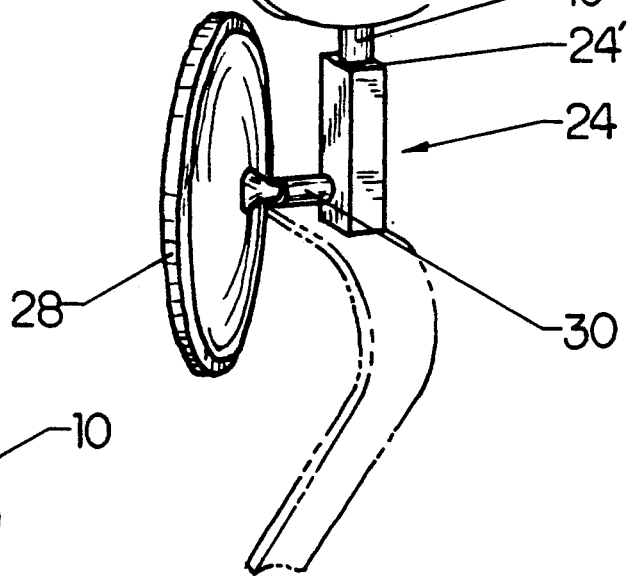
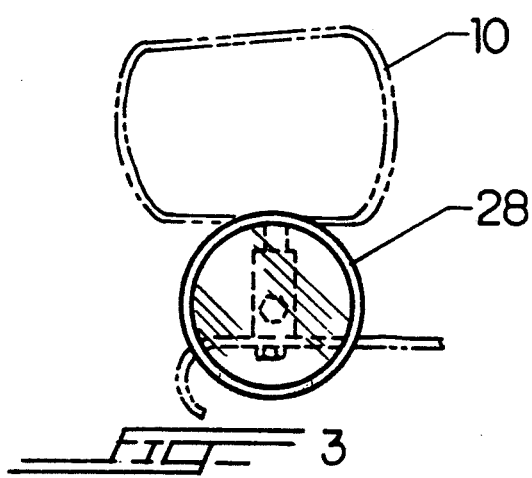

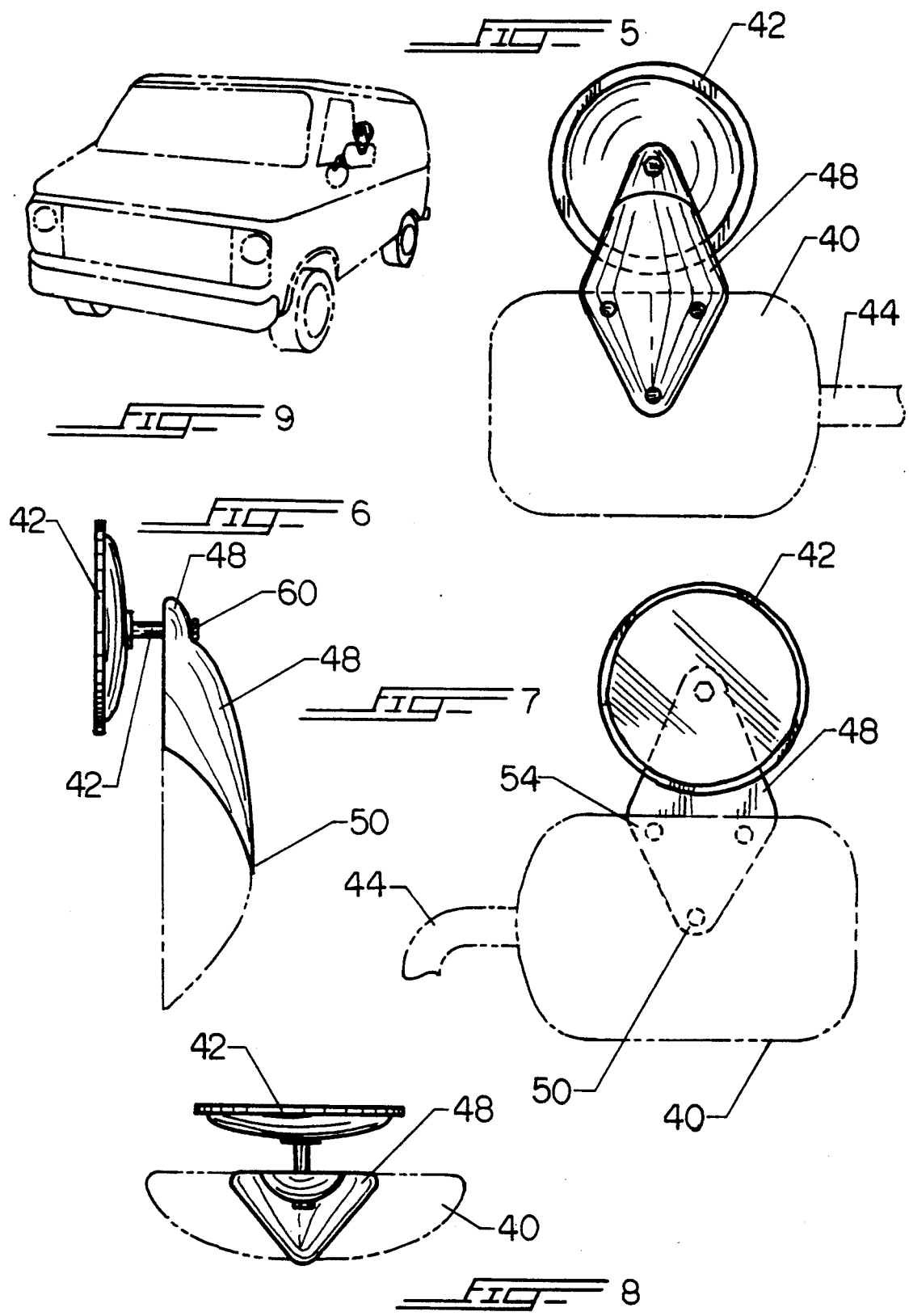

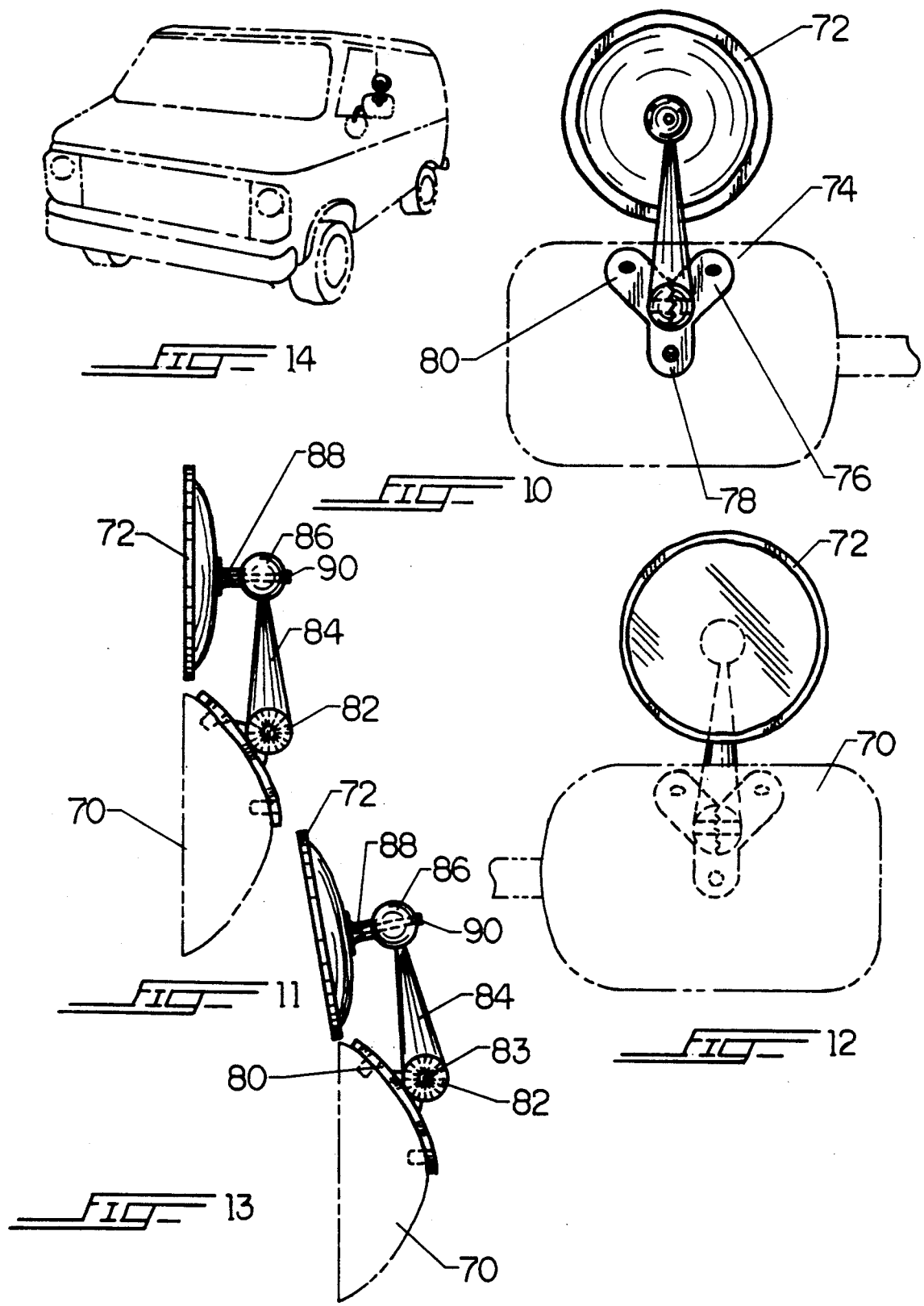

WIDE-ANGLE MIRROR ATTACHMENT FOR A TRUCK OR VAN

BACKGROUND OF THE INVENTION

The present invention is directed to the provision of a second, wide-angle mirror to the existing side mirror of a van or truck, in order to provide the driver of the van or truck a more complete side-viewing without any blind spots as compared with the presently-used, conventional side mirror. The wide-angle mirror attachment of the present invention does not eliminate, but augments the presently-used and existing side mirror, in order to remove all blind spots when viewing the rear and sides of the truck or van during driving.

SUMMARY OF THE INVENTION

It is the primary objective of the present invention to provide a wide-angle mirror to an existing side mirror of a van, pick-up truck, truck, and the like, whereby all blind spots are eliminated when viewing the rear during driving.

It is another objective of the invention to provide such a wide-angle mirror attachment that in the first embodiment is uniquely designed for a specific type of pick-up truck, and, in other embodiments is provided will a more universal-type of mount that allows it to be mounted to most types of trucks and vans.

BRIEF DESCRIPTION OF THE DRAWINGS

The invention will be more readily understood with reference to the accompanying drawings, wherein:

FIG. 1 is a perspective view of a wide-angle mirror attachment for specific use in a Ford pick-up truck or van;

FIG. 2 is a rear view thereof;

FIG. 3 is a front view thereof;

FIG. 4 is a perspective view showing the wide-angle side mirror of FIG. 1 mounted to a Ford pick-up truck;

FIG. 5 is a rear view of a second embodiment of the wide-angle side mirror attachment of the invention that is more universal, for use in most types of vans and trucks;

FIG. 6 is a side elevational view thereof;

FIG. 7 is a front view thereof;

FIG. 8 is a top view thereof;

FIG. 9 is a perspective view showing the wide-angle side mirror attachment of FIG. 5 secured to a van;

FIG. 10 is a rear view of another embodiment of the wide-angle side mirror attachment of the invention incorporating a universal-type of socket joint for mounting to most types of vans and trucks;

FIG. 11 is a side elevational view thereof;

FIG. 12 is a front view thereof;

FIG. 13 is a side elevational view similar to FIG. 11 but showing the wide-angle mirror pivoted forwardly about its ball joint; and FIG. 14 is a perspective view showing the wide-angle side mirror attachment secured a conventional van.

DETAILED DESCRIPTION OF THE INVENTION

Referring now to the drawings in greater detail, in each of the embodiments disclosed herein, a six-inch, wide-angle, convex mirror is securable to the existing side mirror of a van or truck, in order to eliminate all blind spots associated with the conventional side mirror. Such blind spots may occur owing to the relative close mounting of the conventional side mirror to the door of the van or truck, or may be caused by the pulling of a wide load, such as a trailer, which prevents the conventional mirror from "seeing around" the load.

FIGS. 1-4 show a first embodiment of the invention that is specifically adapted for use with Ford pick-up trucks and vans, whose mirrors are of the swing-out type. The conventional side mirror 10 is usually mounted to the door of the van or truck 12 via a U-shaped bracket 16 having a horizontal leg section 20 directly mounting the side mirror 10, and a sloping section 22. According to this embodiment of the invention, the conventional side mirror 10 is raised above its connection to the horizontal leg section 20 via the wide-angle side mirror attachment of the invention, which has a cube-shaped bracket element 24 secured by a bolt 17, or the like, at its lowest end to the upper surface of the horizontal leg section 20 for upstanding projection therefrom. The upper end or surface 24' of the cubic element 24 is provided with a socket for receiving the shaft 10' of the side mirror 10 for conventional rotary adjustment thereby. The cubic element 24 mounts from its rearward-facing surface the six-inch, circular, convex wide-angle mirror 28 via a mounting tube 30 which mounts the wide-angle mirror 28 for swiveling movement, in a conventional manner. The mirror 28 and swivel-tube 30 therefor are conventional. Since the side mirror of the Ford pick-up truck or van is conventionally mounted at a low elevation, any further lowering thereof to accommodate a wide angle mirror would render such side mirror useless. Thus, according to the present invention, the side mirror is lifted up from its normal placement, so that it may still provide its normal functioning, and is lifted up by the very structure that mounts the wide angle mirror adjunct, so that the wide-angle mirror takes on the elevation of the conventional side mirror, with that conventional side mirror now being more elevated, where it is even more useful that before. The height of the bracket element 24 is such as to closely, vertically space the two mirrors together with very little overlap, as can be seen in FIGS. 1-3. The length of the tube 30 is such as to ensure that the wide-angle mirror 28 is positioned rearwardly of the conventional side mirror 10, so that no interference occurs.

A second embodiment of the invention is shown in FIGS. 5-9, and is a more universal-type of mount than that of FIGS. 1-4. In this embodiment, the conventional side mirror 40 remains in its normal state and elevation, and is used to mount the auxiliary, six-inch diameter wide-angle mirror 42. The conventional side mirror 40 is mounted to the door of the vehicle via a conventional shaft 44. According to the invention, the auxiliary wide-angle mirror 42 is mounted above the conventional mirror 40 via a specially-designed, four-point, partially concave bracket 48. From the rear, this bracket 48 is somewhat diamond-shaped and has four points or areas by which is secured to the lower conventional mirror 40 and the upper, auxiliary wide-angle mirror. The lower half of the bracket 48 is concave shaped to fit to the outer convex contour of the upper portion of the conventional mirror 40, as can best be seen in FIG. 6. The three points or areas 50, 52, 54 of the bracket, as seen in FIG. 7, are secured to the conventional side mirror 40 by self-tapping screws or pop rivets. The remaining portion of the bracket 48 projects vertically upwardly to define a straight vertical surface to the upper part 48' of which is secured the wide-angle mirror 42 via a bolt 60, which upper part 48' constitutes the fourth attachment point or area. The bracket 48 is provided with sufficient thickness along its height so as to securely and safely mount the wide-angle mirror 42 to the conventional mirror 40 for all weather or other conditions. Thus, owing to this enhanced thickness, the bracket 48 is only slightly curved in profile, as seen in FIG. 6, until it reaches the upper apex area 48' above-described. The wide-angle mirror 42 with mounting tube 42' is conventional. The bracket 48 is preferably made of aluminum.

Referring to FIGS. 10–14, there is shown a third embodiment of the invention that is a universal-type of mount for all types of vans and trucks. Like the second embodiment, the conventional side mirror 70 stays in its normal elevation and position, and is used to mount the auxiliary, convex, wide-angle mirror 72 thereabove. In this embodiment, there is provided a tripod-like base mount 74 made up of three leg portions 76, 78, 80 extending from a common center and spaced 120 degrees apart, as can be seen in FIG. 10. Each leg member defines an inner surface that is a ⅛ inch thick, bendable steel member, which may be bent into a concave shape for matching the contour of the mirror 70 to which it is attached, as can be seen in FIG. 13. If the mirror 70 has no convex shape, but is flat, then, of course, the leg members remain unbent and straight. Each leg section 76, 78, 80 is secured to the conventional mirror 70 via self-tapping screws or pop rivets. The tripod-like base 74 is preferably mounted on the upper convex surface of the mirror 70, as seen in the figures. A spherical swivel ball 82, ⅜ inch in diameter, is mounted at the common center of the tripod-like base via a bolt 83, which ball 82 serves as a mount for an elongated, mounting pole 84 which tapers inwardly in height. At the top of the pole 84 there is mounted another ⅜ inch diameter ball 86 that directly mounts the tube 88 of the wide-angle mirror 72 via a bolt 90 passing through a hole in the ball 86. The ball 82 allows for the fore-and-aft rotation of the mirror 72 as can be seen by comparing FIGS. 11 and 13. The pole and balls are preferably made of aluminum.

While specific embodiments of the invention have been shown and described, it is to be understood that numerous changes and modifications may be made without departing from the scope, spirit and intent of the invention as set forth in the appended claims.

What I claim is:

1. An attachment for a vehicle for adding an auxiliary, wide-angle mirror to a conventional side mirror thereof, said conventional side mirror having an outer convex surface, comprising:
    first securing means mounted to an upper portion of the outer convex surface of a conventional side mirror of a vehicle, said first securing means having a concave inner surface for mating with the convex shape of the outer convex surface of the conventional side mirror;
    second means projecting upwardly from said first means and having an upper end thereof; and
    an auxiliary, wide-angle mirror mounted to said upper end of said second means, whereby said wide-angle mirror is spaced vertically above the conventional side mirror;
    said first means and said second means being one integral piece, said first means comprising three securement areas for securing it to the convex outer surface of the conventional mirror, and three securement means for passing through said three securement areas; said upper end of said second means defining an additional fourth securement area, and an additional fourth securement means for securing said addition fourth securement area to said wide angle mirror;
    said one integral piece of said first and second means being diamond-shaped, and said four securement areas being approximately constituted by the apices of the diamond-shaped integral piece.

2. The attachment for a vehicle according to claim 1, wherein said diamond-shaped integral piece defines a flat vertical surface terminating in said upper end, said upper end constituting said fourth securement area; said diamond-shaped integral piece being thickened along the height thereof for structural integrity, said flat vertical surface being substantially coplanar with the mirror surface of the conventional side mirror when mounted thereto.

3. The attachment for a vehicle according to claim 2, wherein said wide-angle mirror is spaced rearwardly of the conventional side mirror when mounted thereto via said fourth securement means, whereby the mirror-face of said wide-angle mirror is more rearward than the mirror-face of the conventional side mirror when mounted thereto.

4. The attachment for a vehicle according to claim 3, wherein the first means extends approximately over half of the vertical outer surface of the conventional side mirror when mounted thereto, one of said securement areas being a lowest one and positioned approximately along the center of the outer convex surface of the conventional side mirror when mounted thereto.

5. An attachment for a vehicle for adding an auxiliary, wide-angle mirror to a conventional side mirror thereof, said conventional side mirror having an outer convex surface, comprising:
    first securing means comprising a tripod-like base having three leg sections meeting at a common center, each said leg section extending at an acute angle with respect to each of the other said leg sections, and each said leg section having a concave inner surface mating with the convex shape of the outer surface of a conventional side mirror, and means for mounting each said concave inner surface of each said leg section directly to a respective portion of said outer convex surface of said conventional side mirror, and an articulating means connecting together said three leg sections at said common center;
    second means projecting upwardly from said first means and having an upper end and a lower end thereof, said second means comprising a pole; said articulating means mounting said lower end of said pole for movement of said pole in the fore-and-aft directions; and
    an auxiliary, wide-angle mirror mounted to said upper end of said pole, whereby said wide-angle mirror is spaced vertically above the conventional side mirror;
    said articulating means comprising a ball joint.

6. The attachment for a vehicle according to claim 5, wherein the first means extends approximately over half of the vertical outer surface of the conventional side mirror when mounted thereto.

7. In a motor vehicle having a conventional side mirror, said side mirror comprising a mirror face and an outer convex surface, and means for securing said side mirror to the vehicle, wherein the improvement comprises:

an attachment for a vehicle for adding an auxiliary, wide-angle mirror to a conventional side mirror thereof, comprising first securing means mounted to an upper portion of the outer convex surface of said conventional side mirror, said first securing means having a concave inner surface for mating with the convex shape of the outer convex surface of said conventional side mirror;

second means projecting upwardly from said first means and having an upper end thereof; and an auxiliary, wide-angle mirror mounted to said upper end of said second means, whereby said wide-angle mirror is spaced vertically above the conventional side mirror;

said first means and said second means being one integral piece, said first means comprising three securement areas for securing it to the convex outer surface of the conventional mirror, and three securement means for passing through said three securement areas; said upper end of said second means defining an additional fourth securement area, and an additional fourth securement means for securing said additional securement area to said wide angle mirror;

said one integral piece of said first and second means being diamond-shaped, and said four securement areas being approximately constituted by the apices of the diamond-shaped integral piece.

8. The improvement according to claim 7, wherein said diamond-shaped integral piece defines a flat vertical surface terminating in said upper end, said upper end constituting said fourth securement area; said diamond-shaped integral piece being thickened along the height thereof for structural integrity, said flat vertical surface being substantially coplanar with the mirror surface of said conventional side mirror.

9. The attachment for a vehicle according to claim 8, wherein said wide-angle mirror is spaced rearwardly of said conventional side mirror via said fourth securement means, whereby the mirror-face of said wide-angle mirror is more rearward than the mirror-face of the conventional side mirror.

10. The improvement according to claim 9, wherein said first means spans approximately half of the distance of the vertical outer surface of said conventional side mirror, one of said securement areas being a lowest one and positioned approximately along the center of the outer convex surface of said conventional side mirror.

11. In a motor vehicle having a conventional side mirror, said side mirror comprising a mirror face and an outer convex surface, and means for securing said side mirror to the vehicle, wherein the improvement comprises:

first securing means comprising a tripod-like base having three leg sections meeting at a common center, each said leg section extending at an acute angle with respect to each of the other said leg sections, and each said leg section having a concave inner surface mating with the convex shape of the outer surface of a conventional side mirror, and means for mounting each said concave inner surface of each said leg section directly to a respective portion of said outer convex surface of said conventional side mirror, and an articulating means connecting together said three leg sections at said common center;

second means projecting upwardly from said first means and having an upper end and a lower end thereof, said second means comprising a pole; said articulating means mounting said lower end of said pole for movement of said pole in the fore-and-aft directions; and an auxiliary, wide-angle mirror mounted to said upper end of said pole, whereby said wide-angle mirror is spaced vertically above the conventional side mirror;

each said leg section being bendable for matching it the convex shape of the respective portion of the outer surface of said conventional side mirror;

said articulating means comprises a ball joint.

12. The improvement according to claim 11, wherein the first means spans approximately a distance of half of the vertical outer surface of the conventional side mirror.

* * * * *